United States Patent
Graziano et al.

(10) Patent No.: US 9,451,031 B2
(45) Date of Patent: Sep. 20, 2016

(54) CLOUD-BASED REFRIGERATION SYSTEM

(71) Applicants: Marco Emilio Graziano, Palo Alto, CA (US); David Michael Gjerdrum, Palo Alto, CA (US)

(72) Inventors: Marco Emilio Graziano, Palo Alto, CA (US); David Michael Gjerdrum, Palo Alto, CA (US)

(73) Assignee: VISIBLE ENERGY, INC., Palo Alto, CA (US)

( * ) Notice: Subject to any disclaimer, the term of this patent is extended or adjusted under 35 U.S.C. 154(b) by 417 days.

(21) Appl. No.: 14/082,571

(22) Filed: Nov. 18, 2013

(65) Prior Publication Data

US 2014/0148969 A1    May 29, 2014

Related U.S. Application Data

(60) Provisional application No. 61/796,998, filed on Nov. 28, 2012.

(51) Int. Cl.
*G06F 19/00* (2011.01)
*H04L 29/08* (2006.01)
*G05D 23/19* (2006.01)

(52) U.S. Cl.
CPC ......... *H04L 67/125* (2013.01); *G05D 23/1905* (2013.01); *G05D 23/1931* (2013.01)

(58) Field of Classification Search
USPC ....................................................... 700/276
See application file for complete search history.

(56) References Cited

U.S. PATENT DOCUMENTS

| | | | | |
|---|---|---|---|---|
| 6,891,838 B1* | 5/2005 | Petite | ................... | H04L 12/2825 340/870.02 |
| 2002/0000092 A1* | 1/2002 | Sharood | ................... | F25D 29/00 62/127 |
| 2002/0111698 A1* | 8/2002 | Graziano | ............... | G05B 15/02 700/17 |
| 2006/0259184 A1* | 11/2006 | Hayes | .................... | G05B 15/02 700/221 |
| 2008/0105134 A1* | 5/2008 | Elston, III | ............ | D06F 39/005 99/325 |
| 2008/0184719 A1* | 8/2008 | Lowenstein | ............ | F25D 29/00 62/127 |
| 2012/0131504 A1* | 5/2012 | Fadell | .................. | F24F 11/0086 715/810 |
| 2013/0047630 A1* | 2/2013 | Lu | ........................... | F25B 21/02 62/3.6 |
| 2013/0255297 A1* | 10/2013 | Matsuoka | .............. | F24F 11/006 62/180 |
| 2014/0098247 A1* | 4/2014 | Rao | ......................... | H04W 4/20 348/207.1 |

* cited by examiner

*Primary Examiner* — Kidest Bahta

(57) ABSTRACT

A cloud-based system that includes a plurality of remote refrigerated appliances equipped with a communication and temperature control board with sensors interface, a computing cloud, and a distributed software environment for refrigerators operational data acquisition and storage and for developing testing and executing temperature control methods and with energy optimization techniques is provided. The communication and temperature control board activates the elements of a refrigerated appliance based on direct control of the remote distributed environment executing the temperature control method in software. The distributed software environment executing the temperature control method acquires operational data and energy consumption from the sensors connected to the remote communication and temperature control board and employs energy optimization techniques.

17 Claims, 2 Drawing Sheets

CLOUD-BASED REFRIGERATION SYSTEM

BACKGROUND OF THE INVENTION

1. Field of the Invention

The present invention pertains to the art of refrigerated appliances, and more particularly to a refrigerator having a remote control method as a software task in a cloud-computing environment.

2. Related Art

Refrigerated appliances, for both commercial and domestic use operate a vapor compression cycle in which the closed-circuit refrigerant, liquefied from compression, transitions to gas within an evaporator unit, drawing heat through close contact with the refrigerator compartment. By design, heat of vaporization from the refrigerant's gas phase change effects the extraction of heat from the inside the refrigerator compartment to a condensing unit in order to maintain compartment temperature within a desired range.

The appliance components for the gas compression cycle include a compressor, a condensing unit, an evaporating unit along with an associated fan, and one or more sensors that measure temperature in the various compartments. Additional components may include an evaporator defrost heater, an airflow control damper, a recirculating fan.

A thermostat or a temperature control unit assures that the compartment temperature is around a desired set point by starting and stopping the compression cycle based on input from the sensors and using actuators such as relays. The appliance, control unit is also operating other tasks, such as regulating the airflow inside the compartments and starting defrost cycles during which the evaporator unit is heated to remove frost.

The temperature control method used in existing refrigerated appliances is a component built into the appliance at the time of fabrication. In those rare cases There its parameters other than the set points can be adjusted after field installation, the underlying control method algorithm cannot be changed and is limited by the computational resources available on board the control unit, even in more modern microprocessor-based controllers. Moreover, no factors directly relevant to energy consumption dynamics are taken in consideration.

Temperature control in refrigerators equipped with on-off, fixed speed compressors is typically achieved by means of the classical relay feedback closed-loop with other tasks such as the defrost cycle, performed on a time schedule. Advanced temperature control methods may incorporate adaptive strategies or sophisticated models to minimize energy consumption, but the additional cost in computational resources needed and the resulting appliance complexity, have limited advanced control methods only to some high-end industrial refrigeration systems.

Techniques such as cloud computing systems have begun to be utilized for a variety of applications. Cloud computing relocates the execution of applications, deployment of se ices and storage of data to a server farm, typically of premises and implemented as a service. Applications such as remote control software that have been running on conventional server environments have begun to be hosted in the cloud and utilized as services. Providing a service as hosted in a cloud platform results in an operational advantage, since management of hardware for each remotely controlled device becomes unnecessary by arranging the control server on a large-scale server farm. Among other merits, addition of resources depending on a load of the application is easily performed.

SUMMARY OF THE INVENTION

The present invention overcomes the limitations of current art, with respect to the use of sophisticated control methods, their flexibility and adaptability to variable usage conditions, and the adoption of energy optimization techniques in the method, of conventional refrigerated appliances. It accomplishes this by use of a distributed control method as a software task executed remotely in a cloud-computing environment, and interacting with a control and communication unit in the refrigerated appliance equipped with a network communication interface.

A refrigerated appliance constructed in accordance with the present invention includes a local control and communication unit equipped with a network interface such as Wi-Fi (IEEE 802.11), GSM/UMTS/LTE carrier networks, or Ethernet (IEEE 802.3), and firmware in such unit that allows secure communication with the cloud computing software for sending sensing data and receiving commands for relay on-off operations or other forms of sensing and control. The communication and control unit will activate the on-off relays or other form of analog control present in the refrigerated appliance, only when directed to do so by the remote control software. Additional sensors for energy consumption measurement and other environmental parameters such as external ambient temperature and humidity, food temperature sensors, may also be added to the appliance for use in the control method and with energy optimization techniques.

In an embodiment, a cloud-based control system for controlling at least one refrigerated temperature regulation appliance comprising: at least one sensor electrically connected to said refrigerated appliance for acquiring configured to acquire sensor data of said refrigerated appliance; at least one actuator electrically connected to said refrigerated appliance for setting relay states of said refrigerated appliance; at least one temperature control circuit respectively installed in said refrigerated appliance, and said temperature control circuit comprising: an interface circuit configured electrically connected to said sensor and said actuator; a communication circuit configured to communicate with a network; and a microprocessor electrically connected to said interface circuit and said communication circuit for controlling said interface circuit to receive said sensor data, controlling said communication circuit to send out said sensor data, and executing a control command received from said communication circuit to operate said actuator; and a computing cloud connected to each of said communication circuit via said network, said computing cloud receiving and storing said sensor data, performing a compare and compute function according to said, sensor data for determining said control command, and sending said control command to said communication circuit for controlling said refrigerated appliance.

The disclosed distributed control method includes a software system to be hosted and executed in a cloud-computing environment, and configured to manage interactions and to control a plurality of refrigerated appliances at a given time. One advantage of the disclosed control method is the ability to adopt computationally intense control algorithms, to incorporate mathematical models for energy optimization, and to take in account data and parameters derived from large databases or other external sources of information and services, such as weather forecasts or energy demand from a smart-grid service. Moreover, the disclosed control method can be different for individual or groups of refrigerator appliances, and even dynamically replaced with a different one while guaranteeing proper appliance operation.

The control and communication, unit on board a refrigerated appliance would insure proper functioning in the event of a temporary interruption of the network connection, and the consequent inability to receive control signals, for instance by using a simple relay feedback closed-loop as the control method.

Other embodiments, aspects, and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

The preferred embodiments of the present invention and their advantages are best understood by referring to FIGS. 1 through 2 of the drawings provided below.

System Architecture

Figure 1:
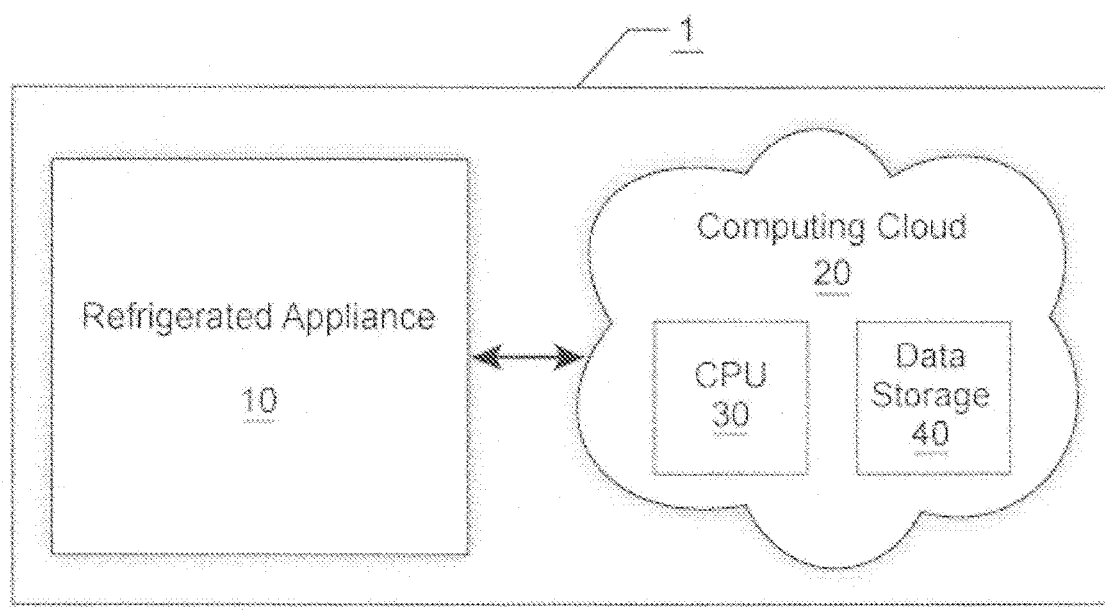
FIG. 1 is a block diagram of an exemplary cloud-based refrigeration system, according to one embodiment of the present invention.

FIG. 1 is a block diagram of an exemplary cloud-based, distributed control for refrigerated appliances 1 according to this disclosure. In this diagram, one or more refrigerated appliances 10 are connected to a computing cloud 20.

One innovative aspect of this disclosure is the ability to deploy software in the computing cloud to control the temperature and other functions of a refrigerated appliance. The control software executing in CPU 30 acquires sensor data from the refrigerated appliance 10 as needed, performs the compare and compute functions of a transfer function of a typical closed-loop feedback control, and sends to the refrigerated appliance control signals that are received and interpreted by the communication and control unit in the appliance and its actuators.

One advantage of the disclosed approach is that the complexity of the transfer function in the control method used is not limited by the resources available inside the appliance, and that it can be composed of any number of steps, each of high computational complexity and requiring the resources typical of a cloud computing environment.

In some embodiments of this disclosure, one software task executed in the computing cloud's CPU 30, with its own private execution and data context, is instantiated in the computing cloud for each controlled refrigerated appliance 16 to perform tile transfer function of that refrigerated appliance.

The computing cloud 20 is accessible from remote locations and includes at least one processing unit 30 and at least one data storage unit 40. The computing cloud 20 is capable of both storing information in data storage 40 and performing data functions of information in CPU 30, as well as to interact with external services.

The refrigerated appliance 10 communicates with the computing cloud 20 using any secured or unsecured protocol, such as the Transport Layer Security (TLS) or any other socket-based communication protocol. The communication between the refrigerated appliance 10 and the computing cloud 20 is "bidirectional", that is data is sent and received by both ends.

The computing cloud 20 includes hardware that does not fit and is cost-prohibitive to incorporate in individual refrigerated appliance 10. Moreover, the computing cloud 20 includes software that would not run or would be cost prohibitive to incorporate in individual refrigerated appliance 10. Therefore, the computing cloud 20 provides this hardware and software resources through secure connections to perform temperature and all other control functions for refrigerated appliance 10.

One of the innovative features of this disclosure is to take advantage of the computational resources in, the computing cloud 20 to perform the control method of refrigerated appliance 10, and to use such resources to incorporate non-linear and time variant control strategies, including, methods and models to minimize energy consumption, and to incorporate data analysis to evaluate and compare different control methods. Moreover, the control method may be individually selected for each refrigerated appliance 10, according to its expected use and location to obtain higher energy efficiency, and adapted to account for local and changing environmental and operational conditions.

In some embodiments, the cloud computing 20 may store sensor data and energy consumption data acquired from refrigerated appliance 10, as well as other data used to estimate the efficiency of the refrigerated appliance 10 and of specific components, such as the compressor. Dedicated analytics software can be used to analyze the collected data, evaluate and compare different control methods and to provide information to improve the methods or to devise new ones.

In some embodiments, the control algorithm may leverage the service-oriented architecture of the cloud computing 20 to access data or other computational and resources available from external services, such as weather forecast for the locations of refrigerated appliance 10, details of relevant events such as receiving new material or foodstuff to be stored in a refrigerated appliance from a shipping company, price or demand-response signals from utilities or other requests related to the operation of a smart-grid and the need for electric load shaving and shifting.

Refrigerated Appliance

Refrigerated appliance 10 is a refrigeration system controlled with a method in a computing cloud 20.

Figure 2:
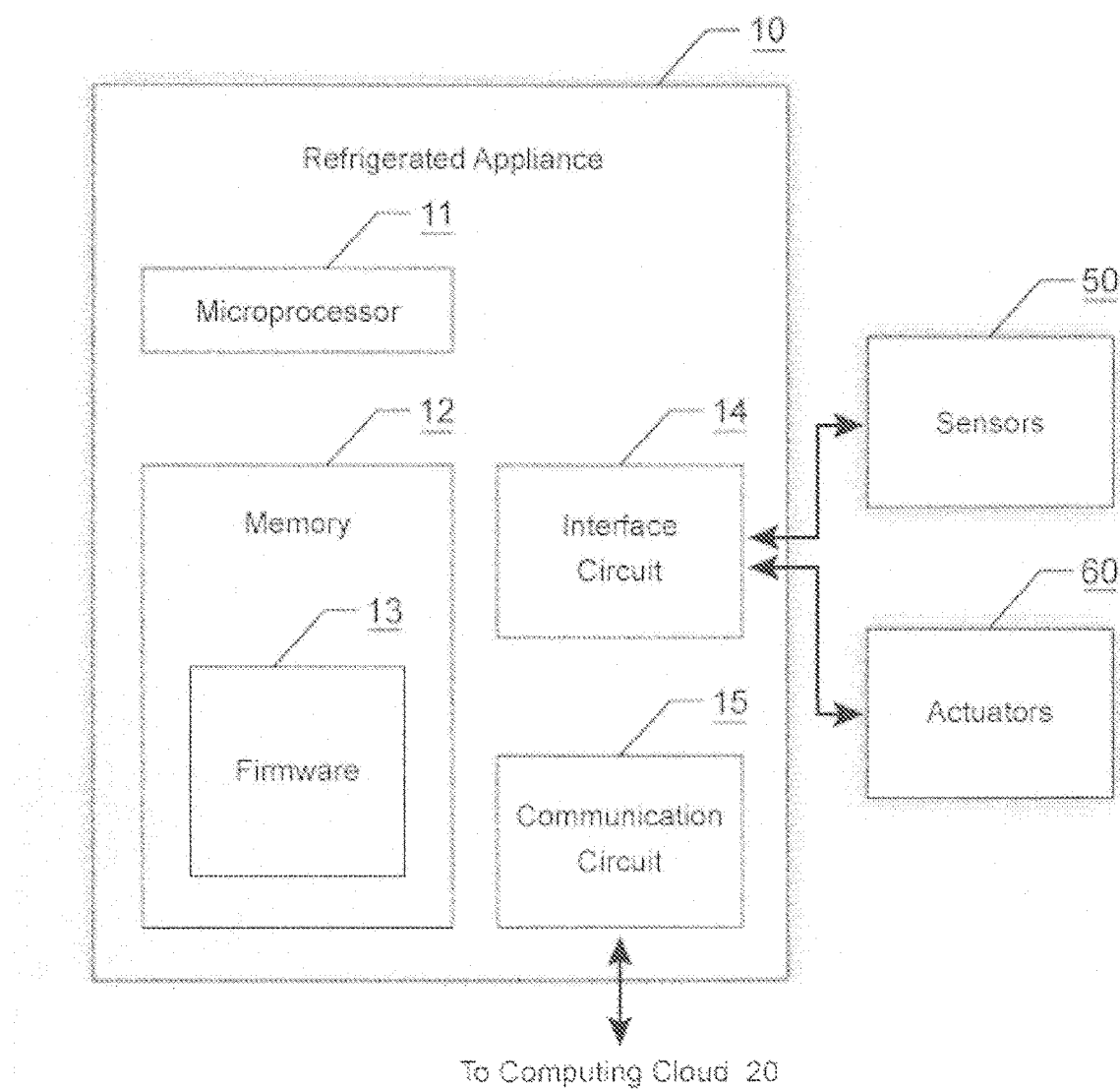
FIG. 2 is a block diagram of an exemplary refrigerated appliance, according to one embodiment of the present invention.

FIG. 2 is the block diagram of an exemplary refrigerated appliance with a cloud-based control method, according to some embodiments of the present invention. Refrigerated appliance 10 includes a microprocessor 11 capable of executing firmware 13 stored in memory 12, an interface circuit 14 used to connect to refrigerator sensors 50 and actuators 60, and a communication circuit 15 used to connect to cloud computing 20. The refrigerated appliance actuators 60 set the state of the relays that controls the equipment used in the refrigerated appliance to perform the vapor compression cycle, such as compressor, evaporator fan, and other components such as airflow fans, defrost heater, lights, and air damper. The refrigerated appliance sensors 50 acquire data from temperature, humidity, energy consumption and other sensors inside the appliance and outside.

Refrigerated appliance firmware 13 incorporates at least functions that acquire sensor data 50 and control the state of actuators 60 through the interface circuit 14, and that allow the refrigerated appliance to communicate to cloud computing 20 through the communication circuit 15. The appliance firmware 13 allows a software task executed remotely in cloud computing 20 to know and change the refrigerated appliance equipment state through the interface circuit 14.

Other functions of the refrigerated appliance firmware 13 include protocol and encryption methods to enable secure communication with cloud computing 20, such as the Transport Layer Security (TLS) protocol.

Refrigerated appliance memory 12 stores the firmware 13 and it may store other configuration data that allow the refrigerated appliance communication circuit to connect to gateways or access points in the access network used by the refrigerated appliance to connect to cloud computing 20.

Advantages of Present Invention

From the above description, it should be apparent that the present invention provides at least the following advantages. First, refrigerated appliance control methods are not limited by resources available in the appliance and are not built into the appliance at time of fabrication. Second, different control methods can be developed and selected depending on intended use of refrigerated appliance, location time variant and other critical parameters. Third, energy efficiency of refrigerated appliances can be incorporated as a parameter in the control method and computationally intensive optimization techniques used in the control method to minimize energy consumption while guaranteeing safety of material stored in the refrigerated compartments of the appliance. Fourth, the cloud-based control method described can be provided to refrigerator appliance manufacturers as a service, incorporating additional functions such as detection of anomalies, malfunctioning of equipment and notification of exceptions or temperature out of range, to the end-user of the refrigerated appliance. Fifth, the stem described allows for collection of field data about the operation of a refrigerated appliance and its energy consumption at a scale that has no precedent. Such data may be used to evaluate energy efficiency performance of refrigerated appliances for regulatory compliance, inspire changes in policies and devise new and more energy efficient control methods.

While particular embodiments of the present invention and their advantages have been shown and described, it should be understood that various changes, substitutions, and alterations could be made therein without departing from the spirit and scope of the invention.

We claim:

1. A cloud-based control system for controlling at least one refrigerated temperature regulation appliance comprising:
   a. a refrigerated appliance;
   b. firmware;
   c. an access network comprising one or more gateways and one or more access points;
   d. memory, wherein the memory stores the firmware;
   e.
   f. a plurality of sensors configured to acquire sensor data, the plurality of sensors selected from a group consisting of: energy consumption measurement sensor, external ambient temperature sensor, external ambient humidity sensor, internal temperature sensor, internal ambient humidity sensor, door opening sensor, food temperature sensor, wherein each of the plurality of sensors is electrically connected to said refrigerated appliance, and wherein at least one of the plurality of sensors measures one or more environmental parameters;
   g.
   h. a plurality of actuators selected from a group consisting of: a compressor actuator, an evaporator fan actuator, a defrost actuator, a fourth generic actuator, wherein each of the plurality of actuators are electrically connected to said refrigerated appliance, wherein each of the plurality of actuators set states of said refrigerated appliance; and
   i. at least one temperature control circuit respectively installed in the refrigerated appliance, and the temperature control circuit comprising:
      i. an interface circuit configured electrically connected to the plurality of sensors and the plurality of actuators,
      ii. at least one communication circuit configured to communicate with a network,
      iii. a microprocessor electrically connected to the interface circuit and the communication circuit for controlling the interface circuit to receive the sensor data, and executing a control command received from the communication circuit to operate the plurality of actuators,
      iv. a computing cloud connected to each of the at least one communication circuit via said network, the computing cloud receiving and storing the sensor data, performing a compare and compute function according to the sensor data for determining the control command, and sending the control command to the at least one communication circuit for controlling the refrigerated appliance, wherein the computing cloud estimates efficiency of the refrigerated appliance,
      wherein the firmware connects the at least one communication circuit to the one or more gateways and the one or more access points.

2. The cloud-based control system according to claim 1, wherein the computing cloud communicates with a temperature control board using socket-based communication protocol and Transport Layer Security (TLS).

3. The cloud-based control system according to claim 2, wherein the computing cloud further comprises a cloud platform, wherein the cloud platform transfers said sensor data and control commands between the computing cloud and the temperature control board.

4. The cloud-based control system according to claim 3, wherein the computing cloud further comprises a data storage server , wherein the data storage server stores the sensor data from the cloud platform.

5. The cloud-based control system according to claim 4, wherein the computing cloud further comprises an execution server , wherein the execution server receives the sensor data from the data storage server, executes the compare and compute function to determine the control command and sends the control command to the cloud platform.

6. The cloud-based control system according to claim 5, wherein the computing cloud further comprises a web application server configured to enable editing or uploading of the compare and compute function by a user, wherein the web application server stores user information and device information associated with the temperature regulation appliance.

7. The cloud-based control system according to claim 6, wherein the application server provides a development interface configured to edit or upload the compare and compute function and a management interface configured to manage the user information and the device information.

8. A cloud-based control method for controlling at least one refrigerated appliance comprising:
   a. acquiring sensor data of a refrigerated appliance from at least one sensor at a temperature control board, wherein the at least one sensor is selected from a group consisting of an internal temperature sensor, an internal humidity sensor, an ambient air temperature sensor, an ambient air humidity sensor, door opening sensor, a food temperature sensor, an energy consumption sensor or a combination thereof;

b. sending the sensor data via a network from the temperature control board to a computing cloud;

c. a cloud platform storing the sensor data in the computing cloud, wherein the sensor data is stored in a data storage server of the computing cloud;

d. performing a compare and compute function according to the sensor data for determining a control command at the computing cloud;

e. the computing cloud estimating the efficiency of the refrigerated appliance;

f. sending the control command via the network from the computing cloud to the temperature control board; and g. executing the control command by a microprocessor of the temperature control board to control at least one actuator selected from a group consisting of a compressor actuator, an evaporator fan actuator, a defrost actuator, a fourth generic actuator, or a combination thereof for setting a state of the refrigerated appliance.

9. The cloud-based control method according to claim 8, further comprising the step of the computing cloud communicating with the temperature control board using a socket-based communication protocol and Transport Layer Security (TLS).

10. The cloud-based control method according to claim 9, wherein the compare and compute function is a transfer function of a closed-loop feedback control.

11. The cloud-based control method according to claim 10, wherein the step of performing the compare and compute function is implemented by an execution server according to the sensor data from the data storage server, wherein the control command is sent to the cloud platform.

12. The cloud-based control method according to claim 11, wherein the step of sending the control command is implemented by the cloud platform.

13. The cloud-based control method according to claim 8 further comprising the steps of: a user editing the compare and compute function; and the user uploading the edited compare and compute function to the computing cloud.

14. The cloud-based control method according to claim 8 further comprising the step of a user managing user information and device information associated with the temperature regulation appliance via a web application server of the computing cloud.

15. The cloud-based control method according to claims 8, further comprising the step of minimizing overall energy use, wherein the at least one sensor includes at least one temperature sensor, wherein the at least one actuator includes a compressor actuator and an evaporator fan actuator, whereby the actuation of compressor and evaporator fan are scheduled independently in accord with temperature.

16. The cloud based control method of claim 8 further comprising the steps of:
    a. Locating the refrigerated appliance; and
    b. Accessing a weather forecast, wherein the weather forecast is based on the location of the refrigerated appliance.

17. The cloud based control method of claim 15 further comprising the steps of:
    a. Selecting one or more control methods; and
    b. Accounting for environmental and operational conditions, wherein the one or more control methods are selected to obtain higher energy efficiency based on the environmental and operational conditions.

* * * * *